(12) United States Patent
Hashimoto et al.

(10) Patent No.: US 10,380,304 B2
(45) Date of Patent: Aug. 13, 2019

(54) ASSISTANCE PROGRAMS, DESIGN ASSISTANCE METHODS, AND INFORMATION PROCESSING APPARATUSES

(71) Applicant: FUJITSU LIMITED, Kawasaki-shi, Kanagawa (JP)

(72) Inventors: Michitaka Hashimoto, Kawasaki (JP); Ryo Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 15/690,491

(22) Filed: Aug. 30, 2017

(65) Prior Publication Data
US 2018/0101634 A1   Apr. 12, 2018

(30) Foreign Application Priority Data
Oct. 12, 2016   (JP) .................. 2016-201330

(51) Int. Cl.
*G06F 17/50*       (2006.01)
*G06N 20/00*       (2019.01)
(52) U.S. Cl.
CPC ........ *G06F 17/5054* (2013.01); *G06F 17/505* (2013.01); *G06F 17/5027* (2013.01); *G06N 20/00* (2019.01)
(58) Field of Classification Search
USPC ........................................ 716/102
See application file for complete search history.

(56) References Cited

U.S. PATENT DOCUMENTS

2011/0055782 A1* 3/2011 Drennan ............. G06F 17/5068
716/112

FOREIGN PATENT DOCUMENTS

JP        2-162466       6/1990
JP        2005-174153    6/2005

* cited by examiner

*Primary Examiner* — Bryce M Aisaka
(74) *Attorney, Agent, or Firm* — Staas & Halsey LLP

(57) ABSTRACT

An information processing apparatus for design assistance including: a memory storing first correspondence relationship information in which feature information of a circuit and a value to be set to a parameter for use to cause an integrated circuit capable of configuring the circuit therein to configure the circuit are associated with each other, and second correspondence relationship information in which each of multiple values settable to the parameter and an improvement level of a performance of the circuit configured by the integrated circuit with the value set to the parameter are associated with each other; and a processor receives feature information related of a target circuit to be designed; if a value of a parameter set to the integrated circuit to configure the target circuit satisfies a predetermined constraint, the received feature information and the value are stored and accumulated in the first correspondence relationship information.

9 Claims, 13 Drawing Sheets

FIG. 5

| PARAMETER | | TARGET | | |
|---|---|---|---|---|
| | | TIMING | AREA | POWER CONSUMPTION |
| LOGIC SYNTHESIS-RELATED | Synth Effort | | | |
| | Auto (DEFAULT) | 2 | 2 | 2 |
| | Fast | 3 | 1 | 1 |
| | Timing Driven | | | |
| | On (DEFAULT) | 3 | 1 | 1 |
| | Off | 2 | 2 | 2 |
| PHYSICAL | Fitter Effort | | | |
| | Auto (DEFAULT) | 2 | 2 | 2 |
| | Standard Fit | 3 | 1 | 1 |
| | Physical Synthesis Effort Level | | | |
| | Normal (DEFAULT) | 2 | 2 | 2 |
| | Fast | 3 | 3 | 3 |
| | Extra | 3 | 1 | 1 |

| PARAMETER | | | TARGET | | |
|---|---|---|---|---|---|
| | | | TIMING | AREA | POWER CONSUMPTION |
| LOGIC SYNTHESIS-RELATED | Synth Effort | Auto (DEFAULT) | 2 | 2 | 2 |
| | | Fast | 3 | 1 | 1 |
| | Timing Driven | On (DEFAULT) | 3 | 1 | 1 |
| | | Off | 2 | 2 | 2 |
| PHYSICAL | Fitter Effort | Auto (DEFAULT) | 2 | 2 | 2 |
| | | Standard Fit | 3 | 1 | 1 |
| | Physical Synthesis Effort Level | Normal (DEFAULT) | 2 | 2 | 2 |
| | | Fast | 3 | 3 | 3 |
| | | Extra | 3 | 1 | 1 |

| | PARAMETER | | TARGET | | |
|---|---|---|---|---|---|
| | | | TIMING | AREA | POWER CONSUMPTION |
| LOGIC SYNTHESIS-RELATED | Synth Effort | Auto (DEFAULT) | 2 | 2 | 2 |
| | | Fast | 3 | 1 | 1 |
| | Timing Driven | On (DEFAULT) | 3 | 1 | 1 |
| | | Off | 2 | 2 | 2 |
| | Fitter Effort | Auto (DEFAULT) | 2 | 2 | 2 |
| | | Standard Fit | 3 | 1 | 1 |
| PHYSICAL | Physical Synthesis Effort Level | Normal (DEFAULT) | 2 | 2 | 2 |
| | | Fast | 1 | 3 | 3 |
| | | Extra | 3 | 1 | 1 |

| | PARAMETER | | TARGET | | |
|---|---|---|---|---|---|
| | | | TIMING | AREA | POWER CONSUMPTION |
| LOGIC SYNTHESIS-RELATED | Synth Effort | Auto (DEFAULT) | 2 | 2 | 2 |
| | | Fast | 3 | 1 | 1 |
| | Timing Driven | On (DEFAULT) | 3 | 1 | 1 |
| | | Off | 2 | 2 | 2 |
| PHYSICAL | Fitter Effort | Auto (DEFAULT) | 2 | 2 | 2 |
| | | Standard Fit | 3 | 1 | 1 |
| | Physical Synthesis Effort Level | Normal (DEFAULT) | 2 | 2 | 2 |
| | | Fast | 1 | 3 | 3 |
| | | Extra | 3 | 1 | 1 |

FIG. 11

| ITEM NO. | Synth Effort | Timing Driven | Fitter Effort | Physical Synthesis Effort Level | TOTAL VALUE |
|---|---|---|---|---|---|
| 1 | Fast | On (DEFAULT) | Standard Fit | Extra | 12 |
| 2 | Auto (DEFAULT) | On (DEFAULT) | Standard Fit | Extra | 11 |
| 3 | Fast | On (DEFAULT) | Auto (DEFAULT) | Extra | 11 |
| 4 | Fast | On (DEFAULT) | Standard Fit | Normal (DEFAULT) | 11 |
| 5 | Fast | Off | Standard Fit | Extra | 11 |
| 6 | Auto (DEFAULT) | On (DEFAULT) | Auto (DEFAULT) | Extra | 10 |
| 7 | Fast | Off | Standard Fit | Normal (DEFAULT) | 10 |
| 8 | Fast | Off | Auto (DEFAULT) | Extra | 10 |
| 9 | Auto (DEFAULT) | On (DEFAULT) | Standard Fit | Normal (DEFAULT) | 10 |
| 10 | Auto (DEFAULT) | On (DEFAULT) | Auto (DEFAULT) | Normal (DEFAULT) | 10 |
| 11 | Fast | On (DEFAULT) | Auto (DEFAULT) | Normal (DEFAULT) | 10 |
| 12 | Fast | Off | Auto (DEFAULT) | Extra | 9 |
| 13 | Auto (DEFAULT) | Off | Auto (DEFAULT) | Extra | 9 |
| 14 | Auto (DEFAULT) | Off | Standard Fit | Normal (DEFAULT) | 9 |
| 15 | Fast | Off | Auto (DEFAULT) | Normal (DEFAULT) | 9 |
| 16 | Auto (DEFAULT) | Off | Auto (DEFAULT) | Normal (DEFAULT) | 8 |

SELECTING PREDETERMINED NUMBER (5) → CONFIGURE IN FPGA AND EXAMINE

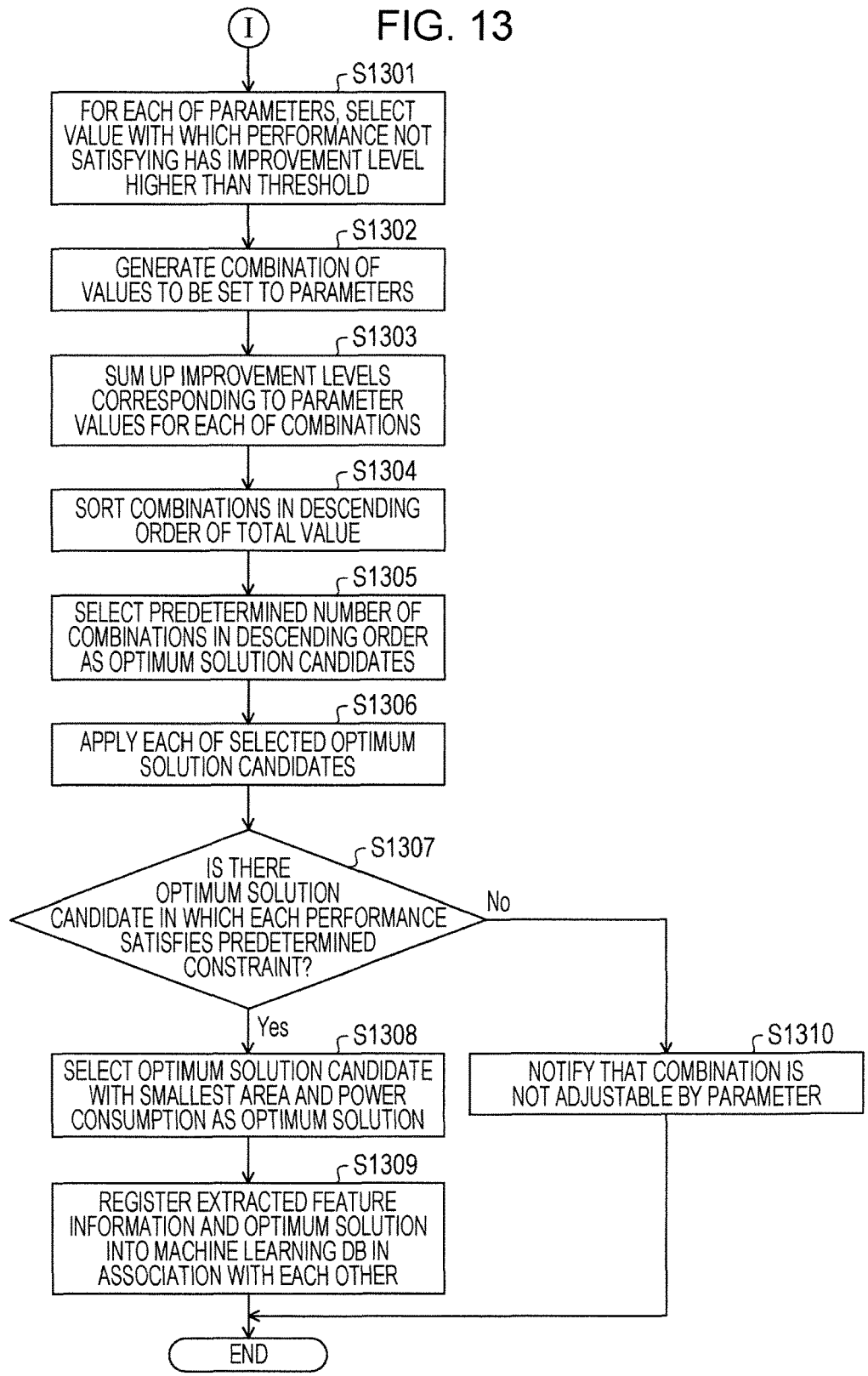

ASSISTANCE PROGRAMS, DESIGN ASSISTANCE METHODS, AND INFORMATION PROCESSING APPARATUSES

CROSS-REFERENCE TO RELATED APPLICATION

This application is based upon and claims the benefit of priority of the prior Japanese Patent Application No. 2016-201330, filed on Oct. 12, 2016, the entire contents of which are incorporated herein by reference.

FIELD

Embodiments discussed herein are related to a design assistance program, a design assistance method, and an information processing apparatus.

BACKGROUND

Conventionally, a field programmable gate array (FPGA) has been known as an integrated circuit which can be configured to have a desired circuit by a customer or designer after manufacturing. As a technique of setting the circuit configuration in the FPGA, a technique is known that logically synthesizes a net list describing functions of a circuit to be designed by using a hardware description language and making a layout in the FPGA based on the net list at a gate level obtained by the logic synthesis. Then, after the circuit is configured in the FPGA, a processing of determining whether timing, area, power consumption, and so on satisfy predetermined constraints is performed.

The processing such as setting a circuit configuration in the FPGA and determining whether the constraints are satisfied is implemented, for example, by using an application program provided by the supplier of the FPGA. For example, the designer sets values to various parameters provided by the application program, and causes the application program to configure a target circuit in the FPGA. Values that can be set as the various parameters are provided in advance.

A related technique is disclosed in Japanese Laid-open Patent Publication No. 2005-174153 for designing a circuit including electrical wirings and optical connections. In this technique, an optical connection list and an electronic circuit connection list are formed by layout designing and evaluation of the electronic circuit, and then optical connections are designed based on the optical connection list, whereas the layout of electronic circuits is designed based on the electronic circuit connection list.

Another related technique is disclosed in Japanese Laid-open Patent Publication No. 2-162466 in which every time an input parameter for use for simulation is corrected, a correction process is stored into a storage device, and an input parameter is corrected by referring to the record of a correction process in which a relationship between a simulation result with a default value given to an input parameter, and a target output is similar to that for the input parameter to be corrected.

However, among values settable to parameters, it is difficult to set values to the parameters such that the performance of a target circuit can satisfy the constraints. For example, depending on the skill level of a designer, it is difficult for the designer to set an optimum value among multiple values to each parameter. Also, it takes time to set selected values to the parameters and then configure the target circuit in the FPGA. Thus, finding an optimum solution by repeating a process of sequentially setting each of multiple values for each of multiple parameters and then causing the FPGA to configure the target circuit until the performance of the target circuit satisfies the constraints is practically difficult as the number of combinations is enormous.

According to one aspect of the present disclosure, it is an object of the present disclosure to provide a design assistance program, a design assistance method, and an information processing apparatus capable of making it easy obtain a value from multiple values settable to each of parameters such that the performance of a target circuit can satisfy the constraints.

SUMMARY

According to an aspect of the invention, an apparatus for design assistance includes: a memory storing first correspondence relationship information in which feature information of a circuit and a value to be set to a parameter for use to cause an integrated circuit capable of configuring the circuit therein to configure the circuit are associated with each other, and second correspondence relationship information in which each of multiple values settable to the parameter and an improvement level of a performance of the circuit configured by the integrated circuit with the value set to the parameter are associated with each other; and a processor receives feature information related of a target circuit to be designed; if a value of a parameter set to the integrated circuit to configure the target circuit satisfies a predetermined constraint, the received feature information and the value are associated and registered, and accumulated in the first correspondence relationship information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of an effectiveness table;

FIG. 8 illustrates an example of a combination of parameter values when timing does not satisfy a constraint;

FIG. 9 illustrates an example of the combination of parameter values when the area and power consumption do not satisfy constraints;

FIG. 10 illustrates an example of the combination of parameter values when the timing, area and power consumption are considered on average;

FIG. 11 illustrates an example of selecting a predetermined number of combinations;

FIG. 13 is a flowchart illustrating an example of a design assistance processing procedure by the information processing apparatus (Part 2).

DESCRIPTION OF EMBODIMENTS

Hereinafter, embodiments of design assistance programs, design assistance methods, and information processing apparatuses according to the present disclosure are described in detail with reference to the accompanying drawings.

Figure 1:
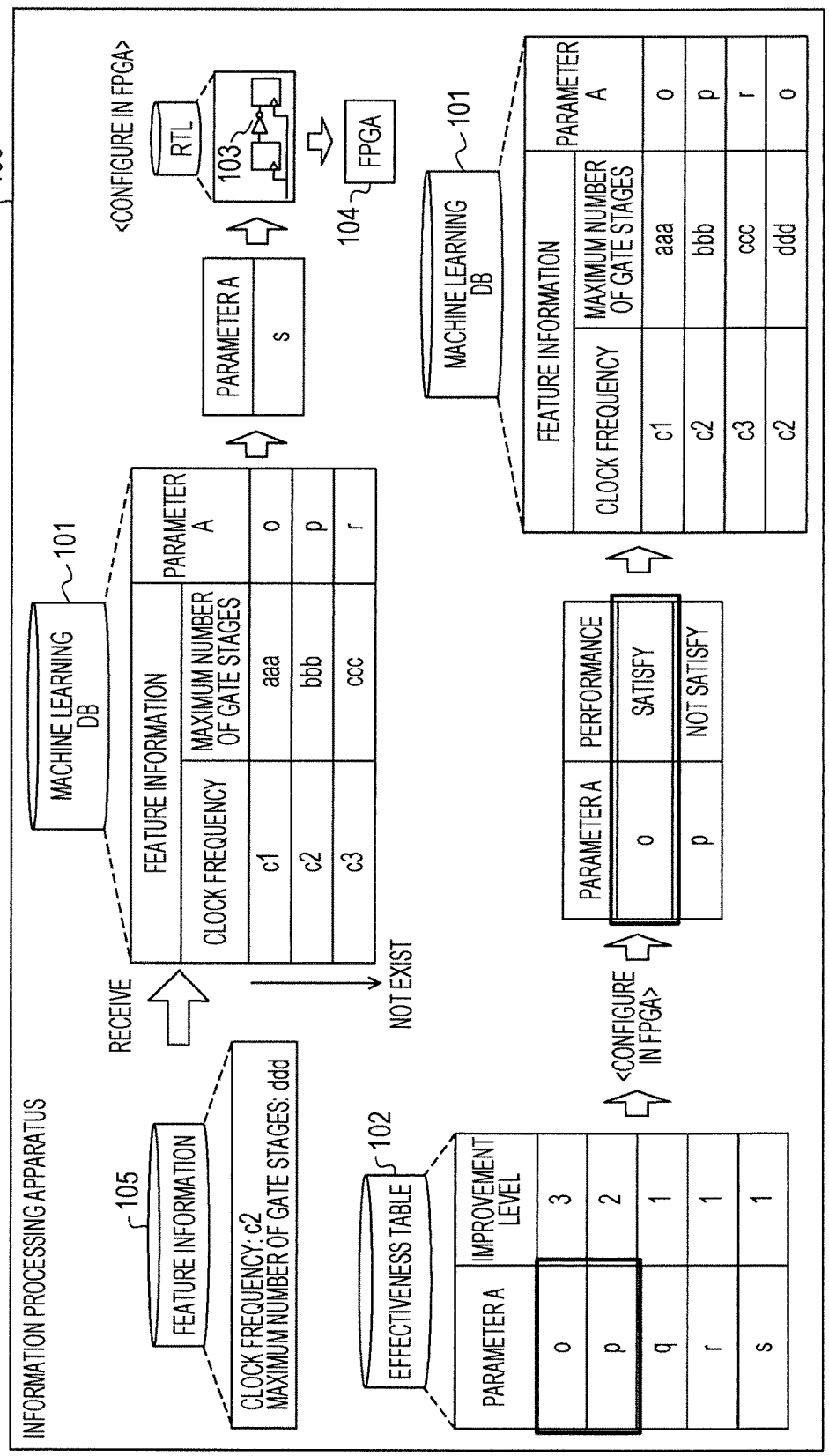
FIG. 1 illustrates an exemplary operation of an information processing apparatus according to the present disclosure.

FIG. 1 illustrates an exemplary operation of an information processing apparatus according to the present disclosure. The information processing apparatus 100 is a computer configured to assist designing of configuring a target circuit 103 in a FPGA 104. The information processing apparatus 100 includes a server and PC.

As described above, conventionally, the designer sets a value to a parameter of an application program provided by a supplier of the FPGA to configure a target circuit in the FPGA.

In recent years, as the target circuit has become larger and faster, performances of the target circuit configured in the FPGA might not satisfy design constraints depending on the values set to the parameters. Among values settable to each parameter, It is difficult to set a value to the parameter such that the performances of the target circuit satisfy the constraints. For example, depending on the skill level of the designer, it is difficult to set an optimum value among multiple values to the parameter. For example, it takes a long time (sometimes about 1 day) for setting a value to the parameter and configuring a target circuit in the FPGA once, although depending on the performances of the computer implementing the application program. Thus, it is difficult to use a method that sets all of multiple values settable to each parameter to parameters sequentially and then causes the FPGA to configure the target circuit until the performances of target circuit satisfy constraints.

Thus, when a machine learning database (DB) does not include feature information of the target circuit 103, the information processing apparatus 100 determines whether the performances of the target circuit 103 satisfy predetermined constraints when the FPGA 104 is caused to configure the target circuit 103 with a value set to the parameter. When a performance of the target circuit 103 does not satisfy a predetermined constraint, the information processing apparatus 100 sets a value to achieve the highest improvement level of the performance to the parameter and causes the FPGA 104 to reconfigure the target circuit 103, and stores the value achieving the satisfactory performance and the feature information into the machine learning DB 101. Thus, the optimum values are easily obtained in a short time. Also, the optimum values may be obtained irrespective of the designer's skill level.

First, a storage unit (not illustrated) stores first correspondence relationship information and second correspondence relationship information. The first correspondence relationship information is information in which feature information related to the specification of a circuit designed in the past and values to be set to parameters for use to cause the for configuring a circuit in an integrated circuit capable of configuring therein the circuit designed in the part to configure a circuit are associated with each other. The first correspondence relationship information is referred to, for example, as a machine learning DB 101. In this embodiment, the FPGA 104 is used as an example of the integrated circuit capable of configuring a circuit therein, but the integrated circuit is not limited to the FPGA 104, and may be any other programmable logic device (PLD).

The second correspondence relationship information is information in which each of multiple values settable to the parameter and an improvement level of the performance of a circuit configured by the integrated circuit with the value set to the parameter are associated with each other. The second correspondence relationship information is referred to, for example, as an effectiveness table 102. In the example of FIG. 1, values settable to a parameter A are five values including "o", "p", "q", "r", and "s".

First, the information processing apparatus 100 receives feature information 105 related to the specification of the target circuit 103 to be designed. In the example of FIG. 1, the information processing apparatus 100 receives information indicating clock frequency and maximum number of gate stages as the feature information 105.

Next, the information processing apparatus 100 searches a value associated with the received feature information 105 by referring to the machine learning DB 101. When a value associated with the received feature information 105 is detected, the information processing apparatus 100 determines the detected value as an optimum value.

In the example of FIG. 1, the feature information 105 including the clock frequency "c2" and maximum number of gates "ddd" is not included in the machine learning DB 101. When there is no value associated with the feature information 105, the information processing apparatus 100 refers to the effectiveness table 102, sets a certain value among multiple values to the parameter, and causes the FPGA 104 to configure the target circuit 103 with a certain value among the multiple values set to the parameter. Then, the information processing apparatus 100 determines whether the performance of the target circuit 103 configured by the FPGA 104 with the certain value set to the parameter satisfies a predetermined constraint when the FPGA 104 is caused to configure the target circuit 103 with the any value set to the parameter. The Performance of the target circuit 103 includes a timing, area, power consumption of the target circuit 103, and so on.

The certain value among multiple values is, for example, a default value provided by the developer of the application program. Conventionally, for example, in a case where the target circuit 103 is not large and processing speed of the target circuit 103 is not fast, the FPGA 104 may configure the target circuit 103 by setting a default value to the parameter such that the performance of the target circuit 103 satisfies the constraint. Thus, if the value is a default value, there is a high possibility that the FPGA 104 configures the target circuit 103 such that the performance of the target circuit 103 satisfies the constraint. Therefore, the information processing apparatus 100 first sets a default value to the parameter.

The certain value may be, for example, a value associated with feature information similar to the received feature information 105. The similar information includes, for example, feature information including a clock frequency whose difference from the clock frequency indicated by the received feature information 105 is within a predetermined range, or feature information indicating at least either one of the clock frequency and maximum number of gate stages is the same as indicated in the received feature information. The certain value may be a value for the improvement level higher than a threshold described later.

In FIG. 1, "s" is indicated as the certain value as an example. When determining that performance of the target circuit 103 satisfies a predetermined constraint, the information processing apparatus 100 determines the value set to the parameter as an optimum value.

When determining that a predetermined constraint is not satisfied, the information processing apparatus 100 selects, from the multiple values, values achieving the improvement levels of a performance of the target circuit 103 being higher than a threshold. In the example of FIG. 1, "o" and "p" are selected. The threshold may be specified by the designer, or be determined by the developer of the information processing apparatus 100 in advance. In this operation, the information processing apparatus 100 may select a value larger than the threshold by excluding the certain value.

Next, the information processing apparatus 100 determines whether the performance of the target circuit 103 configured in the FPGA 104 with a selected value set to the parameter satisfies the predetermined constraint. The predetermined constraint is determined in advance, for example, based on the specification of the target circuit 103. In the example of FIG. 1, when the value of the parameter is "o", the performance of the target circuit 103 satisfies the predetermined constraint. In the example of FIG. 1, when the value of the parameter is "p", the performance of the target circuit 103 does not satisfy the predetermined constraint.

Then, when determining that the performance of the target circuit 103 satisfies the predetermined constraint, the information processing apparatus 100 stores the received feature information 105 and the selected value into the machine learning DB 101 in association with each other. As illustrated in FIG. 1, the value of the parameter "o" and the feature information 105 are stored into the machine learning DB 101 in association with each other. Thus, a value achieving the performance satisfying the constraint may be obtained in a short time and irrespective of the skill level.

(Hardware Configuration Example of Information Processing Apparatus 100)

Figure 2:
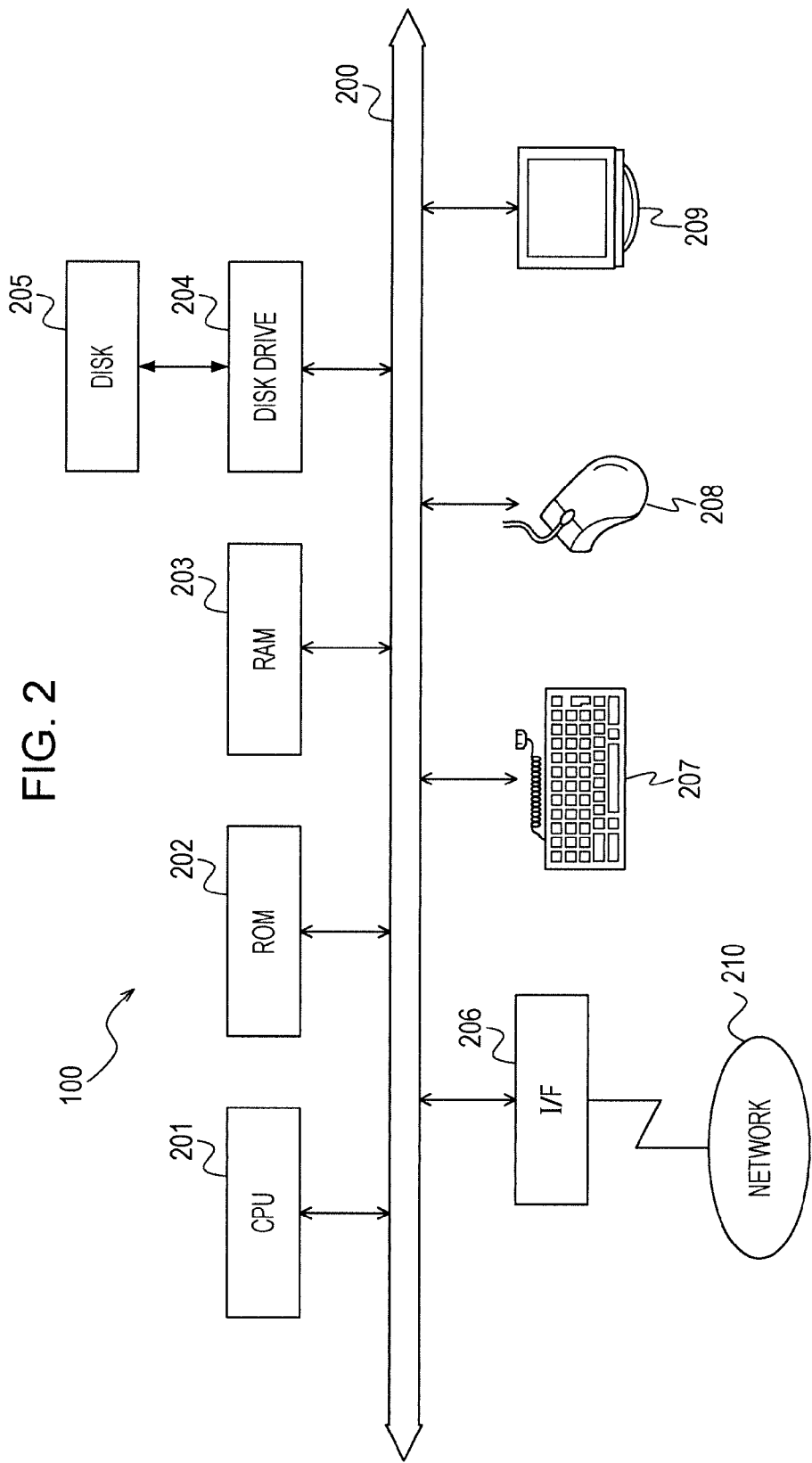
FIG. 2 illustrates a hardware configuration example of the information processing apparatus.

FIG. 2 illustrates a hardware configuration example of the information processing apparatus. The information processing apparatus 100 includes a central processing unit (CPU) 201, a read only memory (ROM) 202, a random access memory (RAM) 203, a disk drive 204, and a disk 205. The information processing apparatus 100 includes an interface (I/F) 206, a keyboard 207, a mouse 208, and a display 209. The CPU 201, ROM 202, RAM 203, disk drive 204, I/F 206, keyboard 207, mouse 208, and display 209 are coupled with each other via a bus 200.

Here, the CPU 201 controls entire information processing apparatus 100. The ROM 202 stores programs such as a boot program. The RAM 203 is used as a work area of the CPU 201. The disk drive 204 controls read/write of data into the disk 205 according to control of the CPU 201. The disk 205 stores data written by control of the disk drive 204. The disk 205 includes, for example, a magnetic disk, an optical disk, and so on.

The I/F 206 is coupled with a network 210 such as a local area network (LAN), wide area network (WAN), and internet via a communication line, and coupled to other apparatuses via the network 210. Then, the I/F 206 serves as an interface between the network 210 and internal components, and controls data input and output to and from an external apparatus. For example, a modem and a LAN adapter may be adopted as the I/F 206.

The keyboard 207 and mouse 208 are interfaces receiving input of various data by user's operation. The display 209 is an interface outputting data in accordance with the instruction from the CPU 201.

Although not illustrated, the information processing apparatus 100 may be provided with an input device capturing an image and video image from a camera, and an input device capturing a voice from a microphone. Although not illustrated, the information processing apparatus 100 may be provided with an output device such as a printer.

In this embodiment, hardware configuration of the information processing apparatus 100 includes a personal computer as an example. However, it is not limited thereto, and a server may be used. In a case where the information processing apparatus 100 is a server, the information processing apparatus 100 may be coupled with an apparatus that user may operate and the display 209 via the network 210.

(Functional Configuration Example of Information Processing Apparatus 100)

Figure 3:
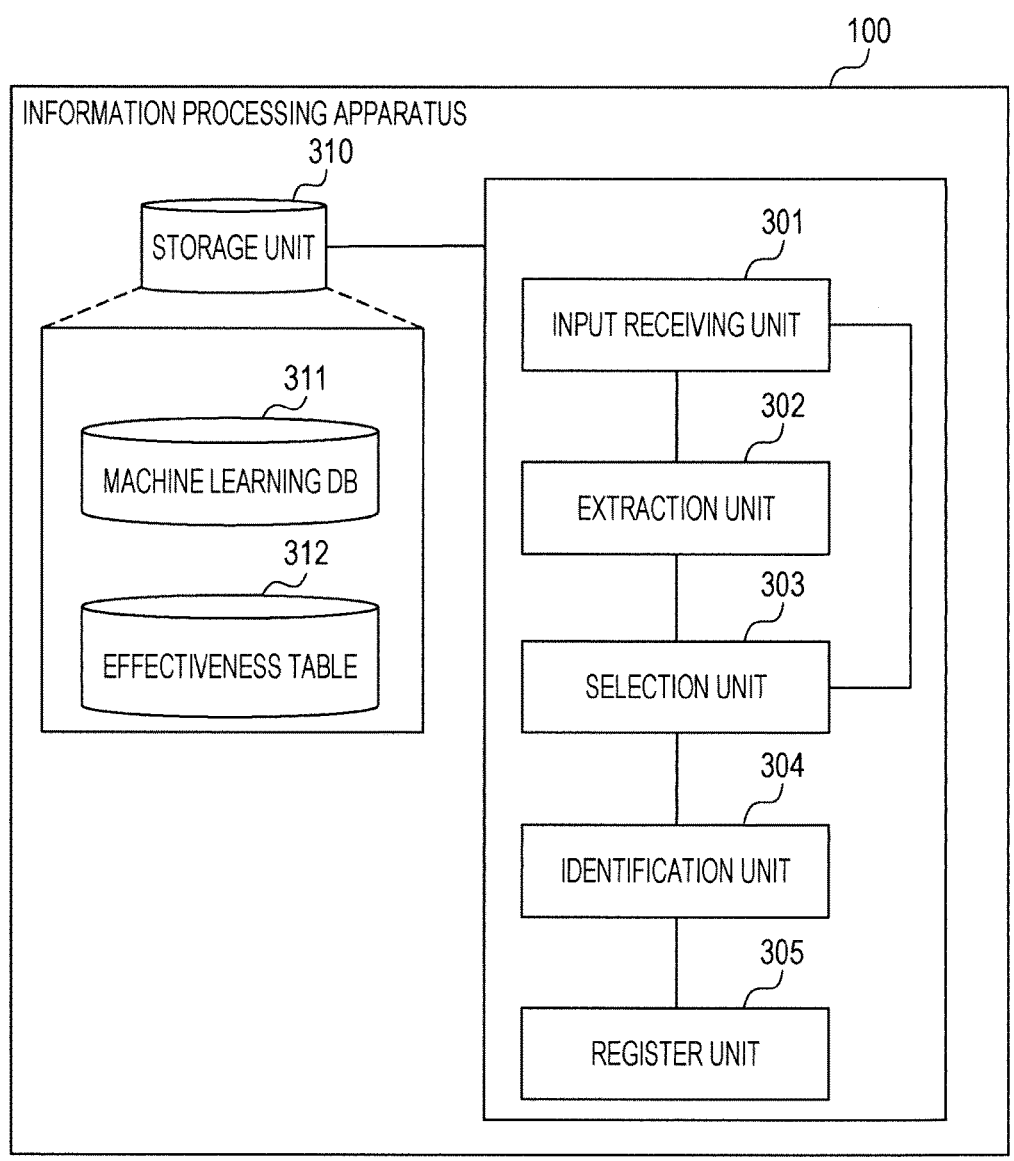
FIG. 3 is a block diagram illustrating a functional configuration example of the information processing apparatus.

FIG. 3 is a block diagram illustrating a functional configuration example of the information processing apparatus. The information processing apparatus 100 includes an input receiving unit 301, an extraction unit 302, a selection unit 303, an identification unit 304, a register unit 305, and a storage unit 310. Processings by a control unit on the aforementioned units 301 to 305 are coded, for example, in a program stored in a storage device illustrated in FIG. 2 to which the CPU 201 is capable of accessing, such as the ROM 202, RAM 203, and disk 205. Then, the CPU 201 reads the program from the storage device and executes the processings coded in the program. Thus, the processings of the control unit are executed. Processing results of the control unit are stored into a storage device such as, for example, the ROM 202, RAM 203, and disk 205.

The storage unit 310 is a storage device such as the ROM 202, RAM 203, and disk 205. The storage unit 310 stores therein, for example, the machine learning DB 311 and the effectiveness table 312.

Figure 4:
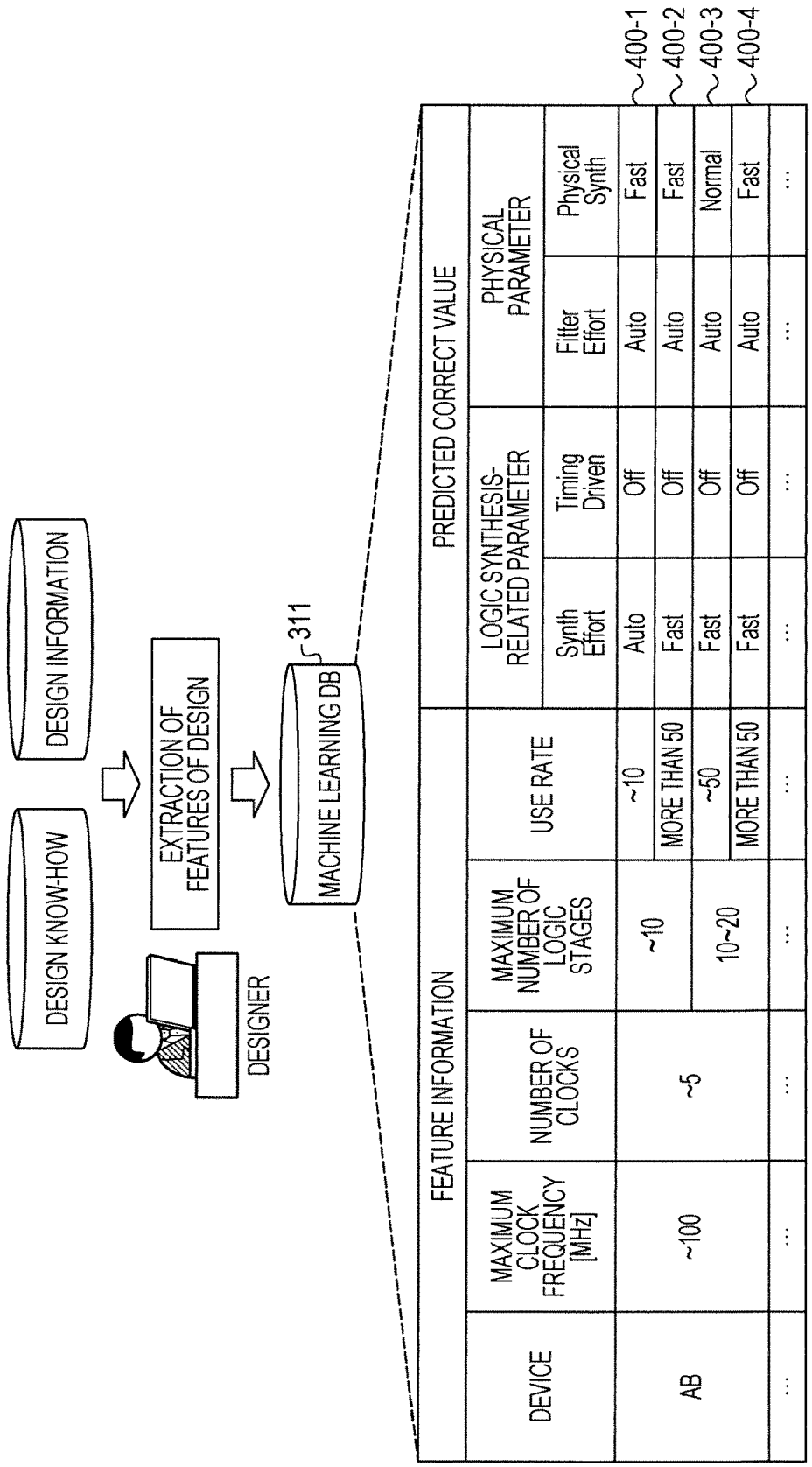
FIG. 4 illustrates an example of a machine learning DB.

FIG. 4 illustrates an example of the machine learning DB. The machine learning DB 311 is first correspondence relationship information that associates the feature information related to the specification of the circuit and the value set to each parameter when the circuit is configured in FPGA, with each other. The machine learning DB 311 is created by the developer of the information processing apparatus 100 by extracting the feature information related to the circuit specification from design knowhow and previous design information. The previous design information includes, for example, register transfer lever (RTL) data, layout data for the layout of the target device, and a report obtained from the layout.

The machine learning DB 311 includes fields of the feature information and predicted correct value. The field of the feature information includes information indicating a feature of the specification of the previously designed circuit. The machine learning DB 311 stores records (for example, 400-1 to 400-4) when information is set into each of the fields.

The field of the predicted correct value includes parameter values used for configuring a previously designed circuit in the FPGA. The field of the feature information includes fields for the device, maximum clock frequency, clock number, maximum number of logic stages, and use rate. The field of the device includes, for example, identification information of the FPGA that becomes a target of configuring the circuit. Identification information of the FPGA is, for example, name of the FPGA. The field of the maximum clock frequency includes a maximum clock frequency of the clock for operating the circuit. The field of the number of clocks includes the number of clocks used in the circuit. The field of the maximum number of logic stages includes a maximum value of the number of gate stages provided in the path. The field of the use rate includes a use rate of the FPGA when the circuit is configured in the FPGA.

The field of the predicted correct value includes a field in which a value may be set for each of parameters. In the example of FIG. 4, parameters are largely classified to a logic synthesis-related parameter and a physical parameter. The field of the logic synthesis-related parameter includes a value of a parameter used for logic synthesis. The field of the physical parameter includes a value of a parameter used for the layout into the FPGA.

In FIG. 4, four parameters including "Synth Effort", "Timing Driven", "Fitter Effort", and "Physical Synth" are illustrated. In the example of FIG. 4, each parameter has one or two values. However, depending on the parameter, about seven values may be set at most. There are 50 to 60 kinds of parameters. Thus, in a case where the number of values settable to each of parameters is two, there exist $2^{50}$ to $2^{60}$ combinations of parameter values.

FIG. 5 illustrates an example of the effectiveness table. The effectiveness table 312 is second correspondence relationship information associating the value of the parameter and the improvement level of each of multiple performances with each other.

The effectiveness table 312 includes a field of the parameter and a field of the target. The field of the parameter includes a value of each of parameters. As described above, parameters are largely classified into a logic synthesis-related parameter and a physical parameter. In the example of FIG. 5, a value settable to each of parameters is set in the field of the parameter.

The field of the target includes fields for a timing, area, and power consumption. The field of the timing includes a timing improvement level of the circuit when the circuit is configured by the FPGA with a value set to the parameter. The timing improvement level of the circuit is a performance improvement level related to the timing. When the performance value related to the timing is a slack value, a larger slack value indicates a better timing. High improvement level of the timing indicates that there is a possibility that the slack value becomes larger.

The field of the area includes the reduction degree of the circuit area of the circuit configured by the FPGA with a value set to the parameter. The area improvement level is a reduction level of the area. The field of the power consumption includes a reduction level of the power consumption of the circuit configure by the FPGA with a value set to the parameter.

In the circuit performances, the area and the power consumption are proportional to each other. The larger the circuit area, the larger the power consumption of the circuit. The smaller the circuit area, the smaller the power consumption of the circuit. Here, performance improvement in the area or power consumption indicates that the area or power consumption is reduced.

Meantime, in the circuit performances, the timing, area and power consumption are inversely proportional to each other. The smaller the slack value being an index value of the timing, the larger the area and power consumption. For example, the larger the slack value being an index value of the timing, the smaller the area and power consumption.

Performance improvement level herein referred to is represented by three levels including "1", "2", and "3". However, the levels are not limited to three, but may be changed variously. "1" indicates that there is no effect of the performance improvement. "2" indicates that there is a small effect of the performance improvement. "3" indicates that there is a large effect of the performance improvement.

In a case where the value "Auto" is set to the parameter "Synth Effort", improvement level of the timing is "2", and improvement level of the area and power consumption is "2".

In FIGS. 4 and 5, there are 24 (2×2×2×3) combinations of parameter values in total.

Next, the input receiving unit 301 illustrated in FIG. 3 receives input of the feature information related to the specification of the circuit to be designed. An example of receiving the feature information is described with reference to FIG. 6.

Figure 6:
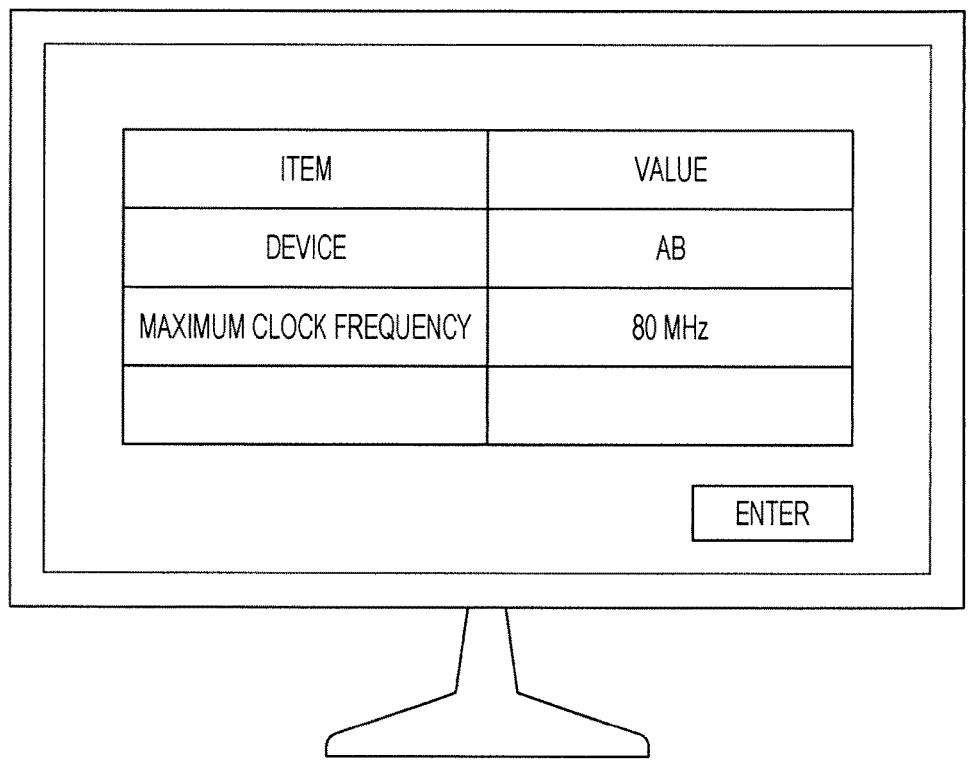
FIG. 6 illustrates an example of reception of feature information.

FIG. 6 illustrates an example of reception of the feature information. The input receiving unit 301 receives, for example, input of information for items related to the target circuit displayed on the display 209 by designer's operation and input. Thus, the input receiving unit 301 receives the feature information.

The information processing apparatus 100 may not only receive the feature information directly but also extract the feature information from various information related to the circuit to be designed. An example of extracting the feature information from various information is described with reference to FIG. 7.

Figure 7:
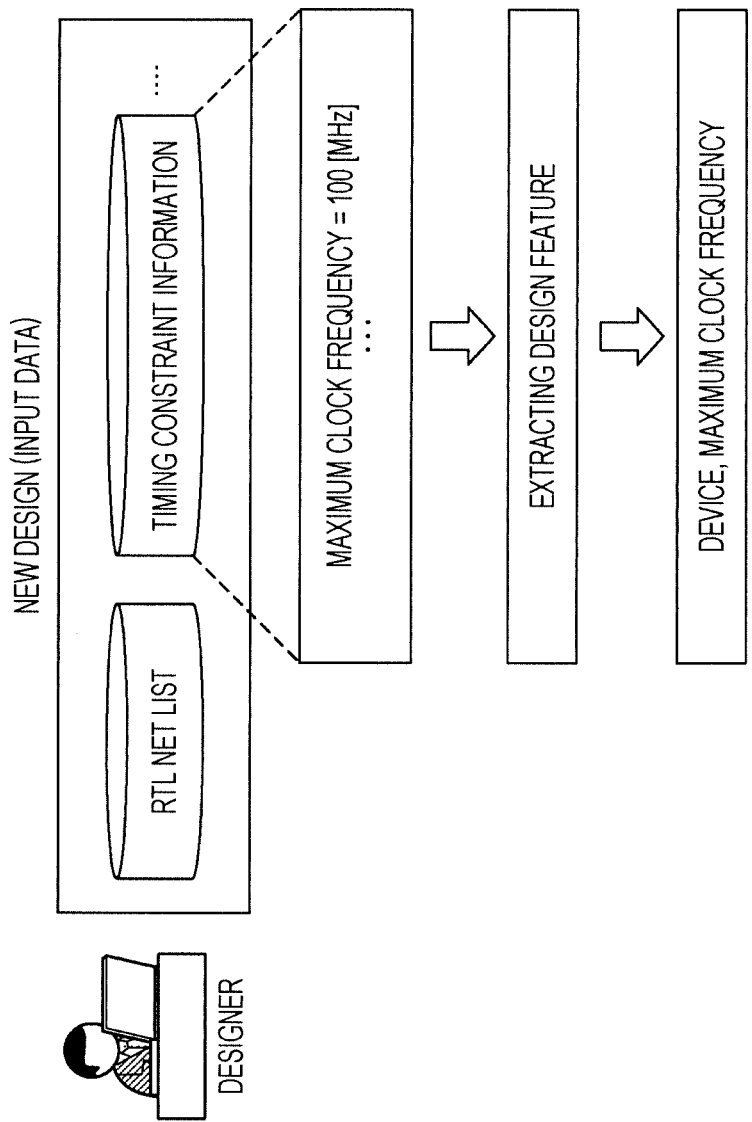
FIG. 7 illustrates an example of extraction of the feature information.

FIG. 7 illustrates an example of extraction of the feature information. The input receiving unit 301 receives input of information related to the design of the target circuit such as a RTL net list indicating cells and connection relationship among cells of the circuit to be designed, and timing constraint information. Then, the extraction unit 302 extracts the feature information related to the specification of the circuit to be designed from the received RTL net list and timing constraint information. The timing constraint information states, for example, the maximum clock frequency. The RTL net list includes, for example, information such as maximum number of gate stages.

Next, referring back to FIG. 3, a case of one parameter and one kind of performance being the evaluation target of the target circuit is described.

The selection unit 303 selects a value associated with the feature information received by the input receiving unit 301 by referring to the machine learning DB 311. The identification unit 304 causes the selection unit 303 to identify a value associated with the feature information received by the input receiving unit 301 into the machine learning DB 311 as an optimum value.

Next, when the machine learning DB 311 includes no value associated with the feature information received by the input receiving unit 301, the selection unit 303 sets a certain value among the multiple values selectable as a parameter to the parameter and causes the FPGA to configure the target circuit. The identification unit 304 determines whether the performance of the target circuit configured by the FPGA with the certain value set to the parameter satisfies the predetermined constraint. As described above, the certain value may be, for example, a default value or a value associated with feature information similar to the received feature information.

When determining that the performance of the target circuit satisfies the predetermined constraint, the identification unit 304 identifies the certain value as an optimum value. The register unit 305 stores the received feature information and the certain value into the machine learning DB 311 in association with each other.

When determining that the performance of the target circuit does not satisfy the predetermined constraint, the selection unit 303 refers to the effectiveness table 312 to select a value achieving the improvement level of the performance of the target circuit being higher than a threshold from multiple values. Then, the selection unit 303 applies the selected value. In this operation, the applying means to cause a target FPGA to configure the target circuit. Operation of causing the target FPGA to configure the target circuit is performed, for example, by an application program that may configure the FPGA in the target circuit. The application program may be implemented by the information processing apparatus 100 or by another apparatus to which the information processing apparatus 100 is accessible.

The identification unit 304 determines whether the performance of the target circuit configured by the FPGA with the target circuit with the selected value set to the parameter satisfies the predetermined constraint. The predetermined constraint is determined in advance, for example, by a designer or based on the specification of the target circuit. The performance of the target circuit 103 includes, for example, a timing, area, power consumption, and so on.

When determining that the performance of the target circuit configured by the FPGA with the selected value set to the parameter satisfies the predetermined constraint, the identification unit 304 identifies the value selected by the selection unit 303 as an optimum value. The register unit 305 stores the received feature information and the optimum value into the machine learning DB 311 in association with each other.

In a case where multiple values are selected, the identification unit 304 determines, for each of the selected multiple values, whether the performance of the target circuit configured by the FPGA with the selected value satisfies the predetermined constraint. When determining that two or more selected values achieve the performance of the target circuit satisfying the predetermined constraint, the identification unit 304 identifies the value achieving the highest performance of the target circuit as an optimum value among the two or more values. Then, the register unit 305 stores the received feature information and the optimum value into the machine learning DB 311 in association with each other.

In this operation, the application program performs, for example, an arrangement and wiring processing of the target FPGA based on a gate level net list obtained by logic synthesis of the RTL net list of the target circuit. Then, the application program identifies the area of the target circuit based on the result of the arrangement and wiring processing. The application program performs timing analysis based on the result of the arrangement and wiring processing. The application program performs analysis of the power consumption based on the result of the arrangement and wiring processing.

Next, a case involving multiple parameters and multiple performances of the target circuit is described.

The selection unit 303 selects, for example, a combination of values to be set to each of multiple parameters corresponding to the received feature information.

The identification unit 304 causes the selection unit 303 to identify a combination associated with the feature information received by the input receiving unit 301 in the machine learning DB 311 as an optimum solution.

Next, when the machine learning DB 311 has no combination associated with the feature information received by the input receiving unit 301, the selection unit 303 sets a certain combination to multiple parameters and causes the FPGA to configure the target circuit. The identification unit 304 determines whether each of multiple performances of the target circuit configured by the FPGA with the certain combination set to the multiple parameters satisfies a predetermined constraint. The certain combination is, for example, a combination of default values and a combination associated with feature information similar to the received feature information.

When determining that the multiple performances of the target circuit satisfy their respective predetermined constraints, the identification unit 304 identifies the certain combination as an optimum solution.

When determining that any of the multiple performances of the target circuit does not satisfy the predetermined constraint, the selection unit 303 refers to the effectiveness table 312 for each of the multiple parameters to select a value such that the improvement level of the performance of the target circuit not satisfying the predetermined constraint is higher than a threshold. In this operation, when two or more kinds of the performances do not satisfy their respective predetermined constraints, the selection unit 303 selects, values such that the improvement levels of all the performances not satisfying the predetermined constraints are higher than a threshold. Or, when two or more kinds of the performances do not satisfy the predetermined constraints, the selection unit 303 may select values such that the improvement levels of all the performances not satisfying the predetermined constraints are equal to the threshold.

Then, the selection unit 303 generates a combination of values to be set to the multiple parameters based on the selected value. The selection unit 303 applies the selected combination. An example of the combinations is described with reference to FIGS. 8 to 10. The selection unit 303 may generate combinations excluding the certain combination.

FIG. 8 illustrates an example of combinations of parameter values when the timing does not satisfy the constraint. For example, when the timing does not satisfy the predetermined constraint, the selection unit 303 selects a combination of parameter values achieving the improvement levels of the timing being higher than the threshold. The threshold is, for example, "2". In FIG. 8, parameter values of the improvement level "2" or more for the timing are enclosed by dotted line frames.

There are four types of parameters, and two values for each of parameters are selected as values of parameters higher than the threshold. In the example of FIG. 8, the selection unit 303 generates 16 (2×2×2×2) combinations of parameter values based on the selected values. The identification unit 304 identifies an optimum solution from the 16 combinations. Thus, since there are 24 combinations for all of parameter values, the identification unit 304 identifies an optimum solution with the number of implementations reduced to ⅔. The implementation indicates that the above application causes the FPGA to configure the target circuit and verifies the performance. Therefore, time for obtaining the optimum solution may be reduced.

FIG. 9 illustrates an example of the combination of parameter values when the area and power consumption do not satisfy the constraints. The selection unit 303 selects values of parameters of the improvement level for the area and power consumption higher than the threshold. The threshold is, for example, "2". In FIG. 9, parameter values of the improvement level "2" or more for the area and power consumption are enclosed by dotted line frames.

There are four types of parameters. As values of parameters higher than the threshold, one value is selected for each of parameters "Synth Effort", "Timing Driven", and "Fitter Effort", and two values are is selected for the parameter "Physical Synthesis Effort Level". In the example of FIG. 9, the selection unit 303 generates 2 (1×1×1×2) combinations of parameter values based on the selected values. The identification unit 304 identifies an optimum solution from 2 combinations. Thus, since there are 24 combinations for all of original parameter values, the identification unit 304 identifies an optimum solution with the number of implementations reduced to $\frac{1}{12}$. Therefore, time for obtaining the optimum solution may be reduced.

FIG. 10 illustrates an example of the combination of parameter values when the timing, area and power consumption are considered on average. The selection unit 303 selects a parameter value of the improvement level higher than the threshold for the area and power consumption. Alternatively, the selection unit 303 selects a parameter value of the improvement level equal to the threshold for the area and power consumption. Here, the threshold is 2. In FIG. 10, parameter values of the improvement level "2" for the area and power consumption are enclosed by dotted line frames.

There are four types of parameters, and one value for each of parameters is selected as a value of the parameter higher than the threshold. In the example of FIG. 10, the selection unit 303 generates 1 (1×1×1×1) combination of parameter values based on the selected values. The identification unit 304 identifies an optimum solution from 1 combination of parameter values. Thus, since there is 1 combination for all of parameter values, the identification unit 304 identifies an optimum solution with the number of implementations reduced to $\frac{1}{24}$. Therefore, time for obtaining the optimum solution may be reduced.

Next, the identification unit 304 determines whether each of the multiple performances of the target circuit configured by the FPGA with the selected combination set to the parameters satisfies the predetermined constraint.

When determining that all the multiple performances of the target circuit configured by the FPGA with the selected combination set to the parameters satisfies the predetermined constraints, the identification unit 304 identifies the selected combination as an optimum solution. Then, the register unit 305 stores the received feature information and the selected combination into the machine learning DB 311 in association with each other.

When there are many combinations, causing the FPGA to configure the target circuit for each of the combinations consumes time. In view of this, the selection unit 303 may select a predetermined number of combinations from the multiple combinations. In this operation, the predetermined number may be received by the input receiving unit 301 through input from the designer, or may be determined in advance by the developer of the information processing apparatus 100.

The selection unit 303 calculates, for example, the combination evaluation value based on the improvement levels associated with the values of parameters included in the combination, for each of the selected combinations. Then, the selection unit 303 selects a predetermined number of combinations based on the calculated evaluation value among multiple combinations. The evaluation value may be, for example, a total value of improvement levels or an average value of improvement values. Therefore, the evaluation value is not limited particularly.

Here, an example of selecting a predetermined number of combinations when the evaluation value is a total value of improvement levels is described. The selection unit 303 sorts combinations in the descending order of the total value of improvement levels being the evaluation value. Then, the selection unit 303 selects the predetermined number of combinations in the descending order.

FIG. 11 illustrates an example of selecting a predetermined number of combinations. FIG. 11 illustrates an example in which 16 combinations illustrated in FIG. 8 are sorted in the descending order of the total value. The predetermined number is, for example, 5. Thus, the selection unit 303 selects 5 combinations in the descending order of the total value. Then, the selection unit 303 applies the selected combinations.

The identification unit 304 determines, for each of the selected combinations, whether each of the multiple performances of the target circuit configured by the FPGA with the selected combination set to multiple parameters satisfies the predetermined constraint.

The identification unit 304 identifies as an optimum solution a combination determined that each of multiple performances of the target circuit satisfies the predetermined constraint. Then, the register unit 305 stores the optimum solution identified by the identification unit 304 and the received feature information into the machine learning DB 311 in association with each other.

When there are multiple combinations determined to achieve a condition that all the multiple performances of the target circuit satisfy the predetermined constraints, the identification unit 304 identifies, among the selected multiple combinations, a combination achieving a certain performance in the multiple performances being the highest among the multiple combinations as an optimum solution. Here, the certain performance is described using the power consumption as an example. For example, The identification unit 304 identifies as an optimum solution a combination achieving the lowest power consumption among the multiple combinations determined to satisfy the performance constraint.

For example, among the selected combinations illustrated in FIG. 11, combinations in which all the performances of the target circuit satisfy predetermined constraints are referred to as a first combination and a second combination.

(Example of Design Assistance Processing Procedure by Information Processing Apparatus 100)

Figure 12:
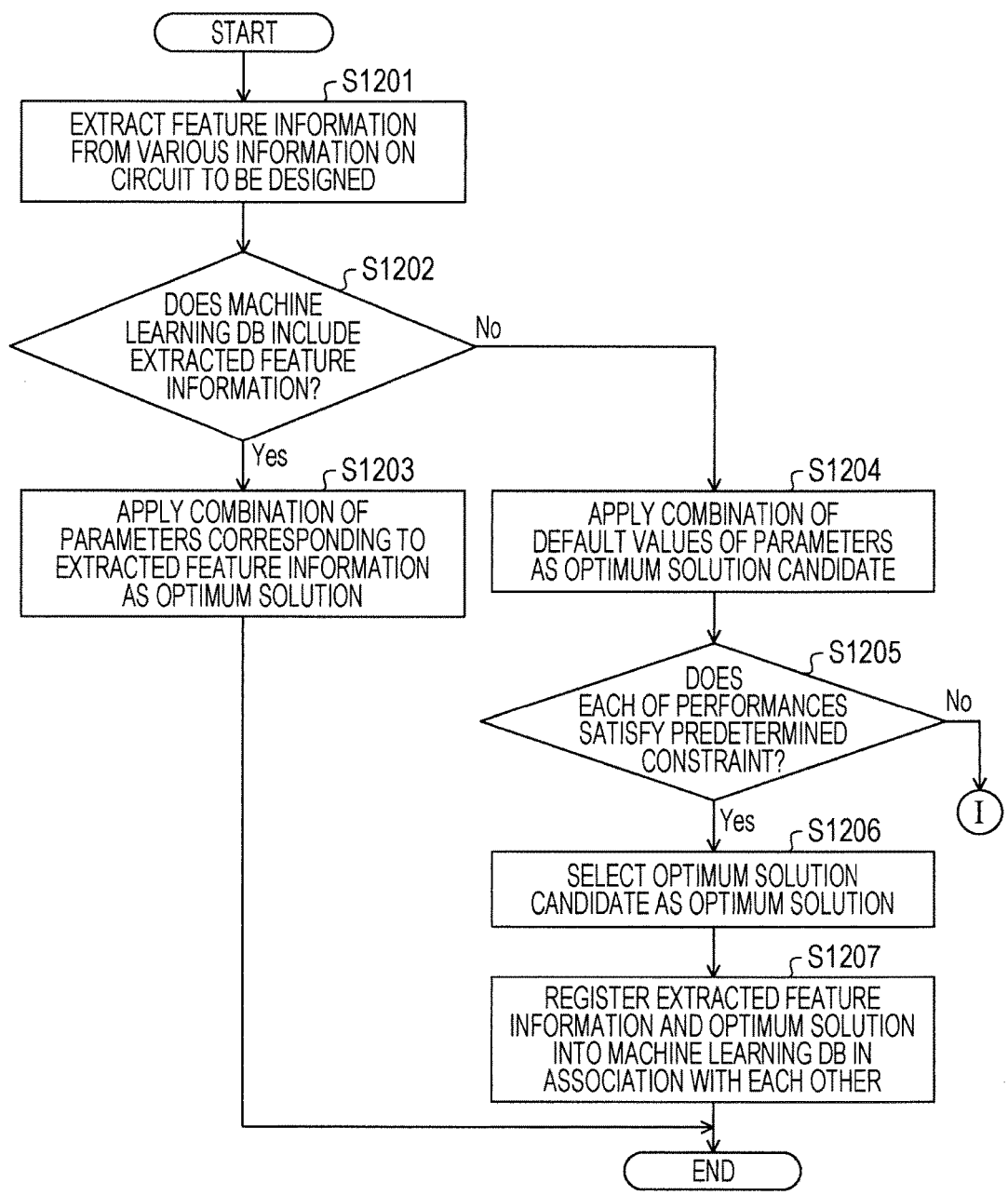
FIG. 12 is a flowchart illustrating an example of a design assistance processing procedure by the information processing apparatus (Part 1)

FIGS. 12 and 13 are flowcharts illustrating an example of the design assistance processing procedure by the information processing apparatus. The information processing apparatus 100, for example, extracts the feature information from various kinds of information related to the circuit to be designed (step S1201). In the step S1201, the information processing apparatus 100 may cause the input receiving unit 301 to receive the feature information itself related to the specification of the target circuit instead of the processing of causing the extraction unit 302 to extract the feature information from received various information related to the target circuit.

Next, the information processing apparatus 100 determines whether the machine learning DB 311 includes the extracted feature information (step S1202). When determining that the machine learning DB 311 includes the extracted feature information (step S1202: Yes), the information processing apparatus 100 applies a combination of parameter values corresponding to the extracted feature information (step S1203), and ends a series of processings. In this operation, applying the combination indicates a series of processings of setting the combination to each of parameters, causing the FPGA to configure the target circuit by the application program and examining the performance of the target circuit.

When determining that the machine learning DB 311 does not include the extracted feature information (step S1202: No), the information processing apparatus 100 selects and applies a combination of default values as an optimum solution candidate (step S1204). Next, the information processing apparatus 100 determines whether all the performances of the target circuit satisfy the predetermined constraints (step S1205). When determining that all the performances of the target circuit satisfy the predetermined constraints (step S1205: Yes), the information processing apparatus 100 selects the optimum solution candidate as an optimum solution (step S1206). The information processing apparatus 100 registers the extracted feature information and optimum solution into the machine learning DB 311 in association with each other (step S1207), and ends a series of processings.

When determining that all the performances of the target circuit do not satisfy the predetermined constraints (step S1205: No), the information processing apparatus 100 proceeds to the step S1301 illustrated in FIG. 13. The information processing apparatus 100 refers to the effectiveness table 312 and selects a value for each of parameters such that the improvement level the performance not satisfying the constraint among performances of the target circuit is higher than the threshold (step S1301). The information processing apparatus 100 generates a combination of values to be set to the multiple parameters (step S1302). Next, the information processing apparatus 100 sums up improvement levels corresponding to the parameter values included in each of the combinations (step S1303). Then, the information processing apparatus 100 sorts the combinations in the descending order of the total value (step S1304). Next, the information processing apparatus 100 selects a predetermined number of combinations in the descending order as optimum solution candidates (step S1305).

Next, the information processing apparatus 100 applies each of the selected optimum solution candidates (step S1306). Then, the information processing apparatus 100 determines whether there is an optimum solution candidate in which all the performances satisfy the predetermined constraints (step S1307).

When determining that there exists an optimum solution candidate in which all the performances of the target circuit satisfy the predetermined constraints (step S1307: Yes), the information processing apparatus 100 selects an optimum solution candidate achieving the smallest area and smallest power consumption as an optimum solution (step S1308). The information processing apparatus 100 registers the extracted feature information and optimum solution into the machine learning DB 311 in association with each other (step S1309), and ends a series of processings. When determining in the step S1307 that there exists no combination in which all the performances of the target circuit satisfy the predetermined constraints (step S1307: No), the information processing apparatus 100 notifies that the target circuit is not adjustable by the parameters (step S1310), and ends a series of processings.

As described above, in a case where the machine learning DB does not include the feature information of the target circuit and the performances of the target circuit configured by the FPGA with a certain value set to the parameter fail to be satisfied, the information processing apparatus 100 causes the FPGA to re-configure by using as the parameter a value achieving the highest improvement level of the performance. Then, the information processing apparatus 100 stores the value achieving the satisfactory performance and the feature information into the machine learning DB. Thus, a value satisfying a performance constraint of the target circuit may be obtained in a short time and irrespective of the skill level of the designer. Consequently, design time may be reduced.

When any of the performances of the target circuit configured by the FPGA with a certain value set to the parameter does not satisfy the predetermined constraint, the information processing apparatus 100 selects a value such that the improvement level of the performance not satisfying the predetermined constraint is higher than a threshold, and causes the FPGA to re-configure the target circuit. Thus, the FPGA may re-configure the target circuit improved in the performance not satisfying the constraint.

When there are multiple parameter values determined that the performance of the target circuit satisfies a predetermined constraint, the information processing apparatus 100 determines a value achieving the highest performance of the target circuit among the selected parameter values as an optimum value. Thus, the FPGA may configure the target circuit further improved in the performance.

In a case where there are multiple parameters, the information processing apparatus 100 generates a combination of values to be set to the multiple parameters, respectively, based on the values selected for the parameters, and causes the FPGA to configure the target circuit with each of the combination set to the multiple parameters. Thus, even when there are multiple parameters, combinations of parameter values in which the performance of the target circuit satisfies the constraint may be obtained easily.

In a case where there are many combinations, the information processing apparatus 100 calculates the evaluation value of the combinations based on the levels associated with the values included in the combination, and selects a predetermined number of combinations in the descending order of the evaluation value. Thus, the number of implementations causing the FPGA to configure the target circuit may be reduced, and thereby design time may be reduced.

When determining that there are multiple combinations in which the performance of the target circuit satisfies the predetermined constraint, the information processing apparatus 100 identifies a combination achieving the highest performance of the target circuit as an optimum solution. Thus, the FPGA may configure the target circuit further improved in the performance.

The design assistance method described in this embodiment may be implemented by executing a design assistance program prepared in advance on a computer such as a personal computer and work station. The design assistance program is recorded in a computer readable recording medium such as a magnetic disk, an optical disk, and a universal serial bus (USB) flash memory, and executed when a computer reads from a recording medium. The design assistance program may be distributed via a network such as internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable and non-transitory medium storing a design assistance program to be executed by a computer including a storage unit that stores first correspondence relationship information in which feature information related to a specification of a circuit and a value to be set to a parameter for use to cause an integrated circuit to configure the circuit are associated with each other, wherein the integrated circuit configures an arbitrary circuit therein based on the parameter, and second correspondence relationship information in which each of multiple values settable to the parameter and an improvement level of a performance of the circuit configured by the integrated circuit with the value set to the parameter are associated with each other, the program causing the computer to execute a process comprising:

receiving feature information related to a specification of a target circuit to be designed;

if there is no value associated with the received feature information in reference to the first correspondence relationship information, and if the performance of the target circuit does not satisfy a predetermined constraint in a case where the integrated circuit configures the target circuit with any of the multiple values set to the parameter, selecting, in reference to the second correspondence relationship information, a value achieving the improvement level of the performance of the target circuit being higher than a threshold from the multiple values;

determining whether the performance of the target circuit configured by the integrated circuit with the selected value set to the parameter satisfies the predetermined constraint; and if it is determined that the performance of the target circuit configured by the integrated circuit with the selected value set to the parameter satisfies the predetermined constraint, storing the received feature information and the selected value into the first correspondence relationship information in association with each other.

2. The medium storing a design assistance program according to claim 1, wherein in the second correspondence relationship information, each of the multiple values and the improvement level of each of multiple performances of the circuit configured by the integrated circuit with the value set to the parameter are associated with each other, and the processing of selecting the value includes referring to the second correspondence relationship information to select, from the multiple values, a value achieving the improvement level higher than the threshold for a performance not satisfying the predetermined constraint among the multiple performances of the target circuit in the case where the integrated circuit configures the target circuit with any of the multiple values set to the parameter.

3. The medium storing a design assistance program according to claim 1, wherein the processing of storing into the first correspondence relationship information includes, if a plurality of the selected values exists, each determined to achieve a condition that the performance of the target circuit configured by the integrated circuit with the selected value set to the parameter satisfies the predetermined constraint, storing the value, among the plurality of selected values, determined to achieve the highest performance of the target circuit configured by the integrated circuit with the selected value set to the parameter and the received feature information in association with each other.

4. The medium storing a design assistance program according to claim 1, wherein in the first correspondence relationship information, the feature information and a value to be set to each of multiple parameters for use to cause the integrated circuit to configure the circuit are associated with each other, in the second correspondence relationship information, for each of the multiple parameters, each of the multiple values settable to each of the parameters and the improvement level of the performance of the circuit configured by the integrated circuit with the value set to the parameter are associated with each other, and the computer is further caused to execute a processing of generating a combination of values to be set to the multiple parameters, respectively, based on the values selected for the multiple parameters, and the processing of determining whether the performance of the target circuit satisfies the predetermined constraint includes determining whether the performance of the target circuit configured by the integrated circuit with the generated combination set to the multiple parameters satisfies the predetermined constraint.

5. The medium storing a design assistance program according to claim 4, wherein the computer is further caused to execute a processing of:

referring to the second correspondence relationship information to calculate an evaluation value of each of a plurality of the generated combinations based on the improvement levels associated with the values included in the combination, selecting a predetermined number of combinations based on the calculated evaluation values among the multiple combinations;

the processing of determining whether the performance of the target circuit satisfies the predetermined constraint includes determining whether the performance of the target circuit configured by the integrated circuit with each of the predetermined number of combinations set to the multiple parameters satisfies the predetermined constraint.

6. The medium storing a design assistance program according to claim 5, wherein the computer is caused to execute a processing of, in a case where the predetermined number of combinations include two or more combinations each determined to achieve a condition that the performance of the target circuit configured by the integrated circuit with the combination to the multiple parameters satisfies the predetermined constraint, identifying the combination achieving the highest performance of the target circuit, and the processing of storing into the first correspondence relationship information includes storing the received feature information and the identified combination into the first correspondence relationship information in association with each other.

7. The medium storing a design assistance program according to claim 1, wherein the computer is caused to execute a processing of, in a case where the performance of the target circuit configured by the integrated circuit with a certain value among the multiple values set to the parameter in reference to the second correspondence relationship information satisfies a predetermined constraint, storing the received feature information and the certain value into the first correspondence relationship information in association with each other.

8. A design assistance method to be executed by a computer including a storage unit that stores first correspondence relationship information in which feature information related to a specification of a circuit and a value to be set to a parameter for use to cause an integrated circuit to configure the circuit are associated with each other, wherein the integrated circuit configures an arbitrary circuit therein based on the parameter, and second correspondence relationship information in which each of multiple values settable to the parameter and an improvement level of a performance of the circuit configured by the integrated circuit with the value set to the parameter are associated with each other, the method causing the computer to execute processings comprising:

receiving feature information related to a specification of a target circuit to be designed;

if there is no value associated with the received feature information in reference to the first correspondence relationship information, and if the performance of the target circuit does not satisfy a predetermined constraint in a case where the integrated circuit configures the target circuit with any of the multiple values set to the parameter, selecting, in reference to the second correspondence relationship information, a value achieving the improvement level of the performance of the target circuit being higher than a threshold from the multiple values;

determining whether the performance of the target circuit configured by the integrated circuit with the selected value set to the parameter satisfies the predetermined constraint; and if it is determined that the performance of the target circuit configured by the integrated circuit with the selected value set to the parameter satisfies the predetermined constraint, storing the received feature information and the selected value into the first correspondence relationship information in association with each other.

9. An information processing apparatus comprising:

a memory that stores first correspondence relationship information in which feature information related to a specification of a circuit and a value to be set to a parameter for use to cause an integrated circuit to configure the circuit are associated with each other, wherein the integrated circuit configures an arbitrary circuit therein based on the parameter, and second correspondence relationship information in which each of multiple values settable to the parameter and an improvement level of a performance of the circuit configured by the integrated circuit with the value set to the parameter are associated with each other; and a processor coupled to the memory and configured to execute a process, the process comprising;

receiving feature information related to a specification of a target circuit to be designed;

if there is no value associated with the received feature information in reference to the first correspondence relationship information, and if the performance of the target circuit does not satisfy a predetermined constraint in a case where the integrated circuit configures the target circuit with any of the multiple values set to the parameter, selecting, in reference to the second correspondence relationship information, a value achieving the improvement level of the performance of the target circuit being higher than a threshold from the multiple values;

determining whether the performance of the target circuit configured by the integrated circuit with the selected value set to the parameter satisfies the predetermined constraint; and if it is determined that the performance of the target circuit configured by the integrated circuit with the selected value set to the parameter satisfies the predetermined constraint, storing the received feature information and the selected value into the first correspondence relationship information in association with each other.

* * * * *